US011926029B2

(12) United States Patent
Wolf et al.

(10) Patent No.: US 11,926,029 B2
(45) Date of Patent: Mar. 12, 2024

(54) APPARATUS, DRIVING-IN DEVICE AND METHOD

(71) Applicant: Hilti Aktiengesellschaft, Schaan (LI)

(72) Inventors: Iwan Wolf, Untervaz (CH); Wolfgang Beck, Schwabsoien (DE); Mario Grazioli, Chur (CH); Joaquin Herrero Fernandez, Augsburg (DE)

(73) Assignee: Hilti Aktiengesellschaft, Schaan (LI)

(*) Notice: Subject to any disclaimer, the term of this patent is extended or adjusted under 35 U.S.C. 154(b) by 264 days.

(21) Appl. No.: 17/415,180

(22) PCT Filed: Nov. 27, 2019

(86) PCT No.: PCT/EP2019/082723
§ 371 (c)(1),
(2) Date: Jun. 17, 2021

(87) PCT Pub. No.: WO2020/126367
PCT Pub. Date: Jun. 25, 2020

(65) Prior Publication Data

US 2022/0063076 A1 Mar. 3, 2022

(30) Foreign Application Priority Data

Dec. 18, 2018 (EP) .................................... 18213477

(51) Int. Cl.
*B25C 1/06* (2006.01)
*B25C 7/00* (2006.01)
*B25F 5/00* (2006.01)

(52) U.S. Cl.
CPC .................. *B25C 1/06* (2013.01); *B25C 7/00* (2013.01); *B25F 5/00* (2013.01)

(58) Field of Classification Search
CPC ................ B25C 1/06; B25C 7/00; B25F 5/00
See application file for complete search history.

(56) References Cited

U.S. PATENT DOCUMENTS 4,721,170 A * 1/1988 Rees ......................... B25C 1/06 173/124
2008/0017689 A1* 1/2008 Simonelli ................. B25C 1/06 227/132

(Continued)

FOREIGN PATENT DOCUMENTS

EP 2 397 260 A2 12/2011
EP 2 604 389 A2 6/2013

(Continued)

OTHER PUBLICATIONS

International Search Report and Written Opinion in International Application No. PCT/EP2019/082723, dated Mar. 4, 2020.

*Primary Examiner* — Anna K Kinsaul
*Assistant Examiner* — Lucas E. A. Palmer
(74) *Attorney, Agent, or Firm* — Leydig, Voit & Mayer, Ltd.

(57) ABSTRACT

An apparatus, comprising a control element, which stops in a stopping position during a recurring sequence of movements, a control device, which is intended for controlling stopping of the control element in the stopping position by at least one control parameter, a detection device for detecting an actual stopping position of the control element at the time of a stopping of the control element, the control device being suitable for forming a difference between the actual stopping position and a desired stopping position of the control element and adapting the control parameter for a subsequent sequence of movements of the control element if the difference exceeds a predetermined desired value.

13 Claims, 6 Drawing Sheets

(56) References Cited

U.S. PATENT DOCUMENTS

2008/0257933 A1* 10/2008 Takahashi ................ B25C 1/06 227/129
2009/0289094 A1* 11/2009 Schiestl ................. B25C 1/008 227/8
2011/0303428 A1* 12/2011 Roth ...................... B25C 1/008 173/1
2011/0303717 A1* 12/2011 Miescher ................. B25F 5/00 227/2
2011/0303719 A1* 12/2011 Spasov ................... B25C 1/003 227/8
2011/0303720 A1* 12/2011 Beck ........................ B25C 1/06 227/8
2011/0303724 A1* 12/2011 Groer ....................... B25C 1/06 227/129
2011/0303725 A1* 12/2011 Schaer ..................... B25C 1/06 227/129
2011/0303726 A1* 12/2011 Blessing .................. B25C 1/06 227/132
2011/0303729 A1* 12/2011 Hahn ........................ B25C 1/14 173/210
2011/0303730 A1* 12/2011 Blessing ................ B25C 1/008 227/156
2011/0303731 A1* 12/2011 Schiestl ................. B25C 1/003 227/156
2013/0153621 A1* 6/2013 Franz ........................ B25C 1/06 227/146
2014/0088753 A1* 3/2014 Lim .......................... B25F 5/00 700/168
2015/0158160 A1* 6/2015 Kato ......................... B25C 1/06 91/55
2016/0167210 A1* 6/2016 Beck ......................... B25F 5/00 29/432
2017/0217004 A1* 8/2017 Kato ......................... B25C 5/15
2018/0126528 A1* 5/2018 Pomeroy ................... B25C 1/06
2020/0039044 A1* 2/2020 Akiba ....................... B25C 1/06
2020/0276691 A1* 9/2020 Akiba ..................... B25C 1/008

FOREIGN PATENT DOCUMENTS

EP 2 604 389 A3 4/2014
EP 2 397 260 A3 4/2015

* cited by examiner

APPARATUS, DRIVING-IN DEVICE AND METHOD

CROSS-REFERENCE TO RELATED APPLICATIONS

This patent application is the U.S. National Stage of International Patent Application No. PCT/EP2019/082723, filed Nov. 27, 2019, which claims the benefit of European Patent Application No. 18213477.5, filed Dec. 18, 2018, which are each incorporated by reference.

TECHNICAL FIELD

The invention relates to an apparatus and a method for controlling a recurring sequence of movements of a control element and also a driving device and a method for controlling a setting device for driving a fastening element into a base material.

PRIOR ART

In the case of such apparatuses, it is possible that certain positions of the control element shift over time. In order to ensure that, even after quite a long time, the control element reaches all of the important positions during the recurring sequence of movements, relatively long distances are provided for the control element to cover. It is desirable to provide an apparatus and a method with which these distances can be reduced.

SUMMARY OF THE INVENTION

The object is achieved in the case of an apparatus, comprising a control element, which stops in a stopping position during a recurring sequence of movements, a control device, which is intended for controlling stopping of the control element in the stopping position by means of at least one control parameter, a detection device for detecting an actual stopping position of the control element at the time of a stopping of the control element, the control device being suitable for forming a difference between the actual stopping position and a desired stopping position of the control element and adapting the control parameter for a subsequent sequence of movements of the control element if the difference exceeds a predetermined desired value. It is thereby ensured that, even after quite a long time, the control element reliably reaches the stopping position even when the distances to be covered are kept short. In some circumstances, this allows the apparatus to be reduced in size. Preferably, the control element reverses its direction of movement during the recurring sequence of movements in the stopping position.

A further advantageous embodiment is characterized in that the apparatus is fitted in a driving device for driving a fastening element into a base material, the driving device comprising a power unit and a driving element, formed in particular as a piston, which is driven by the power unit from a starting position into a setting position, in order to drive a fastening element into the base material, and the control element returning the driving element from the setting position into the starting position. Preferably, the power unit comprises a potential energy store, formed particularly preferably as a spring, for storing potential energy by means of which the driving element is driven, and an energy transmission device for transmitting energy from an energy source to the potential energy store.

Likewise preferably, the driving device comprises a clutch device with an open state and a closed state, the clutch device temporarily arresting the driving element in the starting position in a closed state of the clutch device, and a detection device for detecting a transition of the clutch device from the open state into the closed state, the control unit being suitable for calculating a distance covered by the control element between a transition of the clutch device from the open state into the closed state and a stopping of the control element, in order to detect the actual stopping position of the control element.

A further advantageous embodiment is characterized in that the energy transmission device comprises the control element, the control element being moved into the stopping position in order to store potential energy in the potential energy store.

A further advantageous embodiment is characterized in that the energy transmission device comprises a motor for driving the control element, the at least one control parameter comprising an electrical voltage, a current intensity, a rotational speed and/or a switching-off time of the motor during the recurring sequence of movements.

A further advantageous embodiment is characterized in that the energy transmission device comprises a spindle drive, which is preferably driven by the motor and has a threaded spindle and a spindle nut, the control element comprising the threaded spindle or the spindle nut.

The object is likewise achieved in the case of a method for controlling a recurring sequence of movements of a control element which stops in a stopping position during the recurring sequence of movements, the method comprising the following steps:

- controlling a stopping of the control element in the stopping position by means of at least one control parameter,
- detecting an actual stopping position of the control element at the time of a stopping of the control element,
- forming a difference between the actual stopping position and a desired stopping position of the control element,
- adapting the at least one control parameter for a subsequent sequence of movements of the control element if the difference exceeds a predetermined desired value.

It is thereby ensured that, even after many recurring sequences of movements, the control element reliably reaches the stopping position even when the distances to be covered are kept short. Preferably, the control element reverses its direction of movement during the recurring sequence of movements in the stopping position.

An advantageous embodiment is characterized in that the method is carried out in a method for controlling a setting device for driving a fastening element into a base material, the setting device comprising a power unit and a driving element, formed in particular as a piston, which is driven by the power unit from a starting position into a setting position, in order to drive a fastening element into the base material, the control element returning the driving element from the setting position into the starting position in the recurring sequence of movements. Preferably, the setting device comprises a potential energy store, formed in particular as a spring, for storing potential energy by means of which the driving element is driven, and an energy transmission device for transmitting energy from an energy source to the potential energy store.

A further advantageous embodiment is characterized in that the driving device also has a clutch device with an open state and a closed state, the clutch device temporarily arresting the driving element in the starting position in a closed state of the clutch device, and the actual stopping position of the control element being detected by a distance covered by the control element between a transition of the clutch device from the open state into the closed state and a stopping of the control element being calculated.

A further advantageous embodiment is characterized in that the energy transmission device comprises the control element, the control element being moved into the stopping position in order to store potential energy in the potential energy store.

A further advantageous embodiment is characterized in that the energy transmission device comprises a motor for driving the control element, the at least one control parameter comprising an electrical voltage, a current intensity, a rotational speed and/or a switching-off time of the motor during the recurring sequence of movements.

EXEMPLARY EMBODIMENTS

Exemplary embodiments of an apparatus for driving a fastening element into a base material are explained in more detail below on the basis of examples with reference to the drawings, in which.

Figure 1:
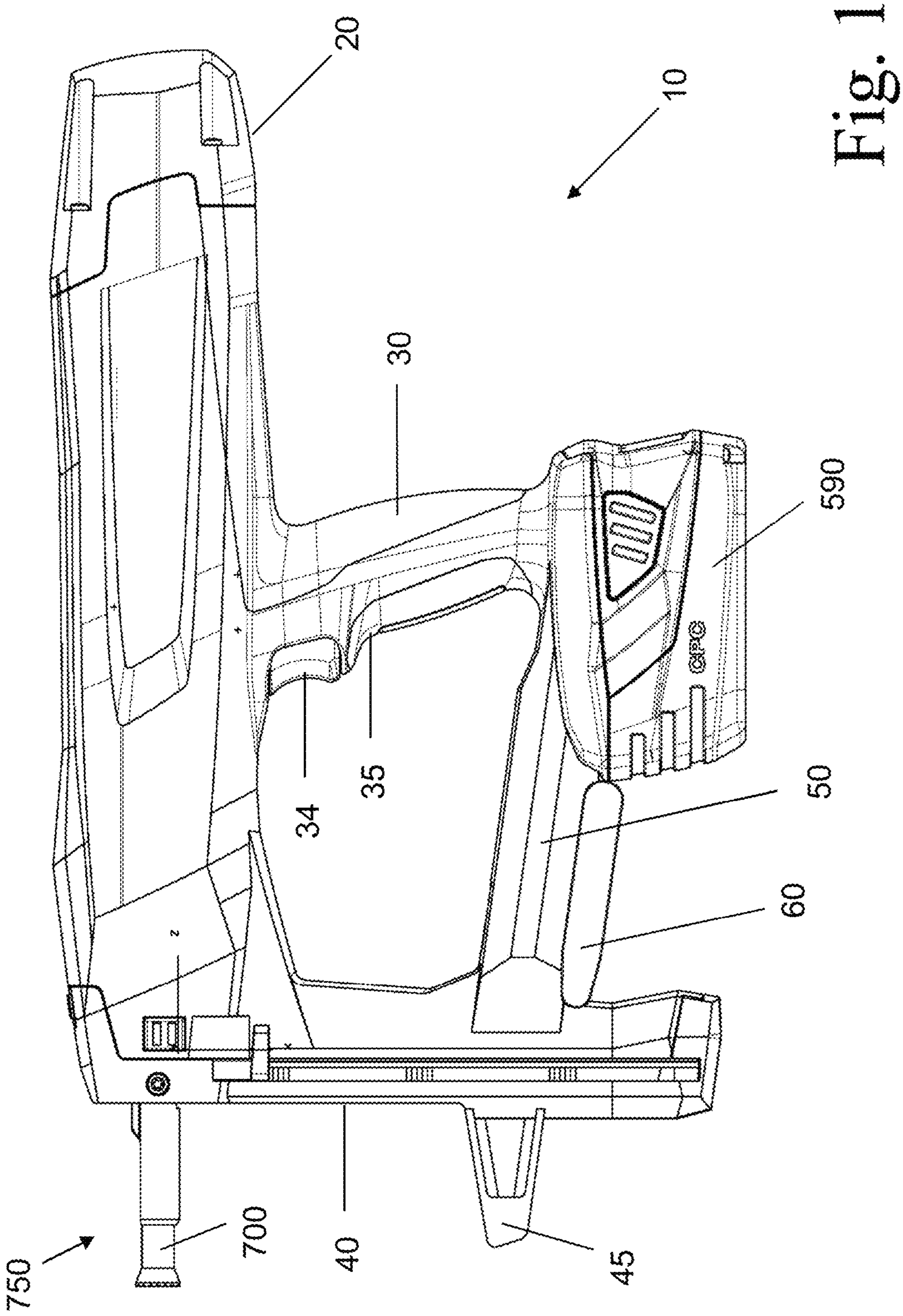
FIG. 1 shows a side view of a driving apparatus.

FIG. 1 shows in a side view a driving apparatus 10 for driving a fastening element, for example a nail or bolt, into a base material. The driving apparatus 10 has an energy transmission element (not represented) for transmitting energy to the fastening element and also a housing 20 containing the energy transmission element and a power unit (likewise not represented) for moving the energy transmission element.

The driving apparatus 10 also has a handle 30, a magazine 40 and a bridge 50 connecting the handle 30 to the magazine 40. Attached to the bridge 50 are a scaffold hook 60 for suspending the driving apparatus 10 on a scaffold or the like, and an electrical energy store designed as an electrical storage battery 590. On the handle 30, a trigger 34 and a grip sensor designed as a hand switch 35 are arranged. Furthermore, the driving apparatus 10 has a guide channel 700 for guiding the fastening element and a pressing device 750 for detecting a distance of the driving apparatus 10 from a base material (not represented). Aligning the driving apparatus perpendicularly to a base material is assisted by an alignment aid 45.

Figure 2:
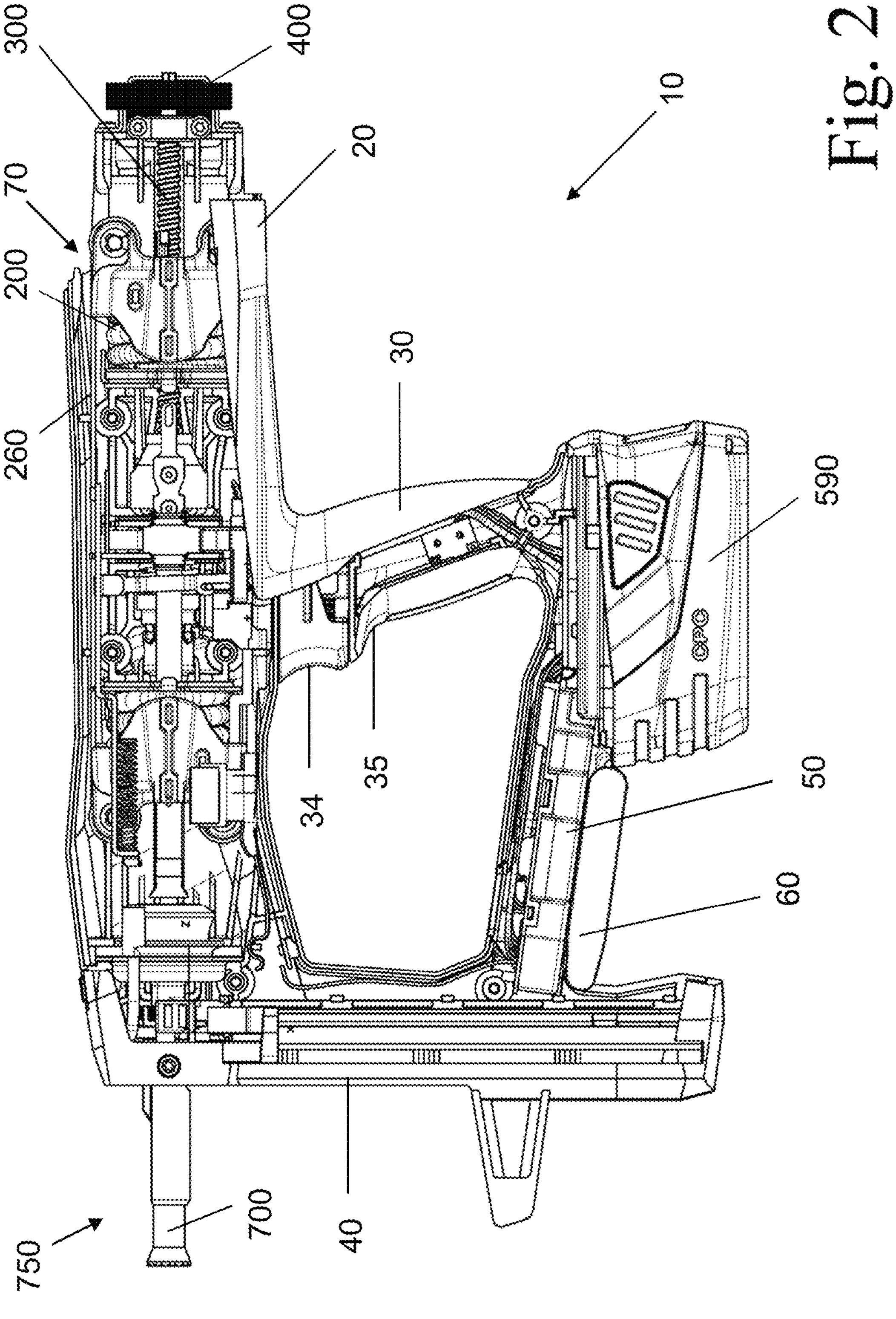
FIG. 2 shows a side view of the driving apparatus with an opened housing.

FIG. 2 shows the driving apparatus 10 with an opened housing 20. The housing 20 contains a power unit 70 for moving an energy transmission element that is concealed in the drawing. The power unit 70 comprises an electric motor (not represented) for converting electrical energy from the battery 590 into rotational energy, a torque transmission device comprising a gear mechanism 400 for transmitting a torque of the electric motor to a motion converter formed as a spindle drive 300, a force transmission device comprising a roller train 260 for transmitting a force from the motion converter to a mechanical energy store formed as a spring 200 and for transmitting a force from the spring 200 to the energy transmission element.

Figure 3:
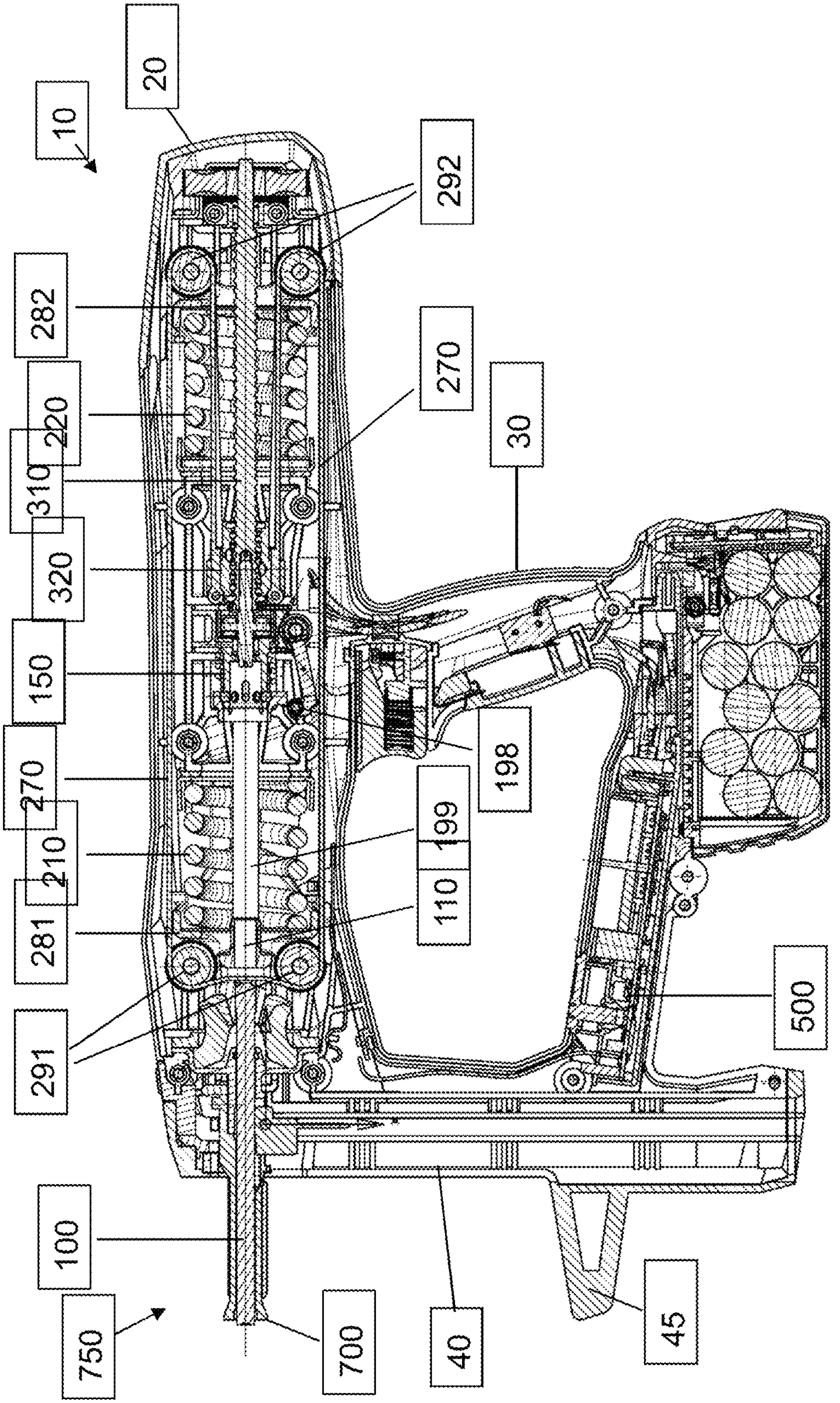
FIG. 3 shows a longitudinal section of the driving apparatus.

FIG. 3 shows a longitudinal section of the driving apparatus 10, after a fastening element has been driven forward, that is to say to the left in the drawing, into a base material with the aid of the energy transmission element formed as a piston 100. The piston is in its setting position. The front spring element 210 and the rear spring element 220 are in the relaxed state, in which they actually still have a certain amount of residual stress. The front roller holder 281 is in its forwardmost position in the operating sequence and the rear roller holder 282 is in its rearmost position in the operating sequence. The spindle nut 320 is at the front end of the spindle 310. As a result of the in some circumstances relaxed spring elements 210, 220 apart from the residual stress, the band 270 is substantially free of load.

As soon as the control device 500 has detected by means of a sensor that the piston 100 is in its setting position, the control device 500 causes a return operation, in which the piston 100 is moved into its starting position. For this purpose, a motor rotates the spindle 310 in a first rotational direction by way of the gear mechanism 400, so that the rotationally secured spindle nut 320 is moved to the rear.

The return rods 199 thereby engage in a return pin of the piston 100, and thus likewise move the piston 100 to the rear. The piston 100 thereby takes along the band 270, whereby the spring elements 210, 220 are not tensioned, however, since the spindle nut 320 likewise takes along the band 270 to the rear and releases just as much band length over the rear rollers 292 as the piston draws in between the front rollers 291. The band 270 thus remains substantially free of load during the return operation.

Figure 4:
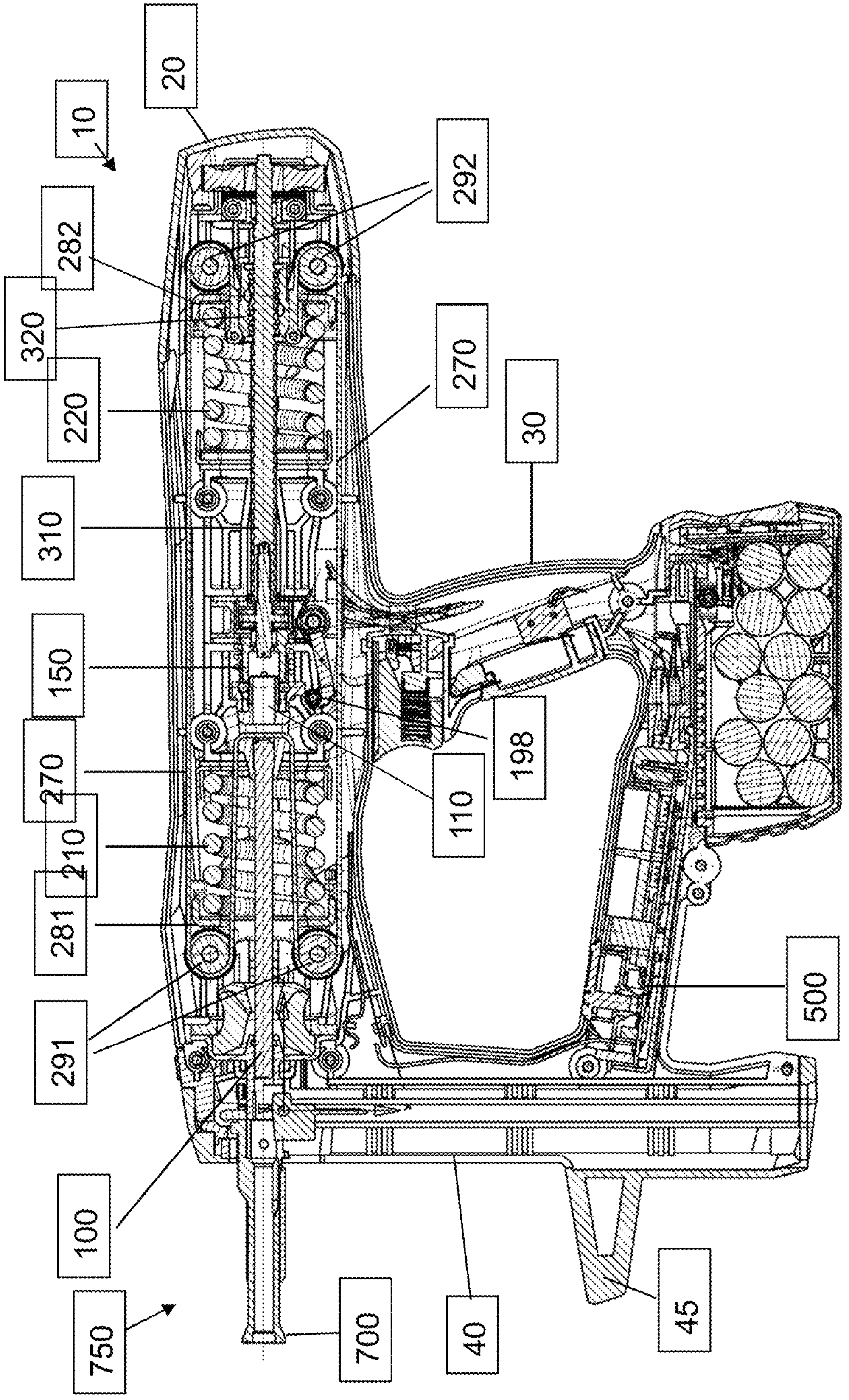
FIG. 4 shows a longitudinal section of the driving apparatus.

FIG. 4 shows a longitudinal section of the driving apparatus 10 after the return operation. The piston 100 is in its starting position and is engaged with its coupling plug-in part 110 in the clutch device 150. The front spring element 210 and the rear spring element 220 are still in their respective relaxed state, the front roller holder 281 is in its forwardmost position and the rear roller holder 282 is in its rearmost position. The spindle nut 320 is at the rear end of the spindle 310. As a result of the relaxed spring elements 210, 220, the band 270 is still substantially free of load.

If the driving apparatus is then lifted off the base material, so that the pressing device 750 is displaced forward relative to the guide channel 700, the control device 500 causes a tensioning process in which the spring elements 210, 220 are tensioned. For this purpose, the motor rotates the spindle 310 by way of the gear mechanism 400 in a second rotational direction, opposite to the first rotational direction, so that the rotationally secured spindle nut 320 is moved forward. At the same time, the clutch device 150 arrests the coupling plug-in part 110 of the piston 100, so that the length of band that is drawn in by the spindle nut 320 between the rear rollers 292 cannot be released by the piston. The roller holders 281, 282 are therefore moved toward one another and the spring elements 210, 220 are tensioned.

Figure 5:
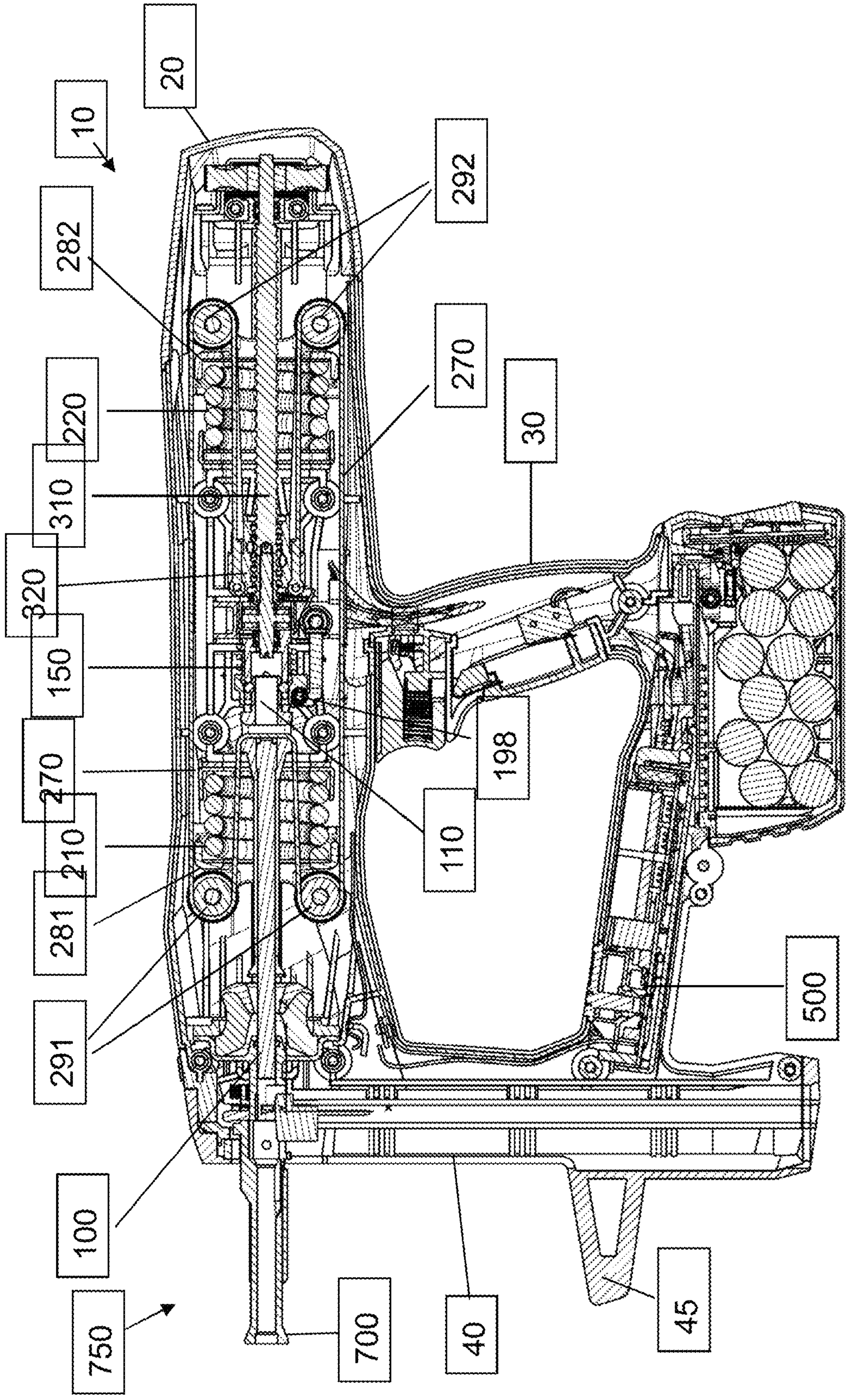
FIG. 5 shows a longitudinal section of the driving apparatus.

FIG. 5 shows a longitudinal section of the driving apparatus 10 after the tensioning process. The piston 100 is still in its starting position and is engaged with its coupling plug-in part 110 in the clutch device 150. The front spring element 210 and the rear spring element 220 are tensioned, the front roller holder 291 is in its rearmost position and the rear roller holder 282 is in its forwardmost position. The spindle nut 320 is at the front end of the spindle 310. The band 270 deflects the tensioning force of the spring elements 210, 220 at the rollers 291, 292 and transmits the tensioning force to the piston 100, which is held against a holding force by the clutch device 150.

The driving apparatus 10 is now ready for a driving-in operation. As soon as a user pulls the trigger 34, the clutch device 150 releases the piston 100, which then transmits the tensioning energy of the spring elements 210, 220 to a fastening element and drives the fastening element into the base material.

Figure 6:
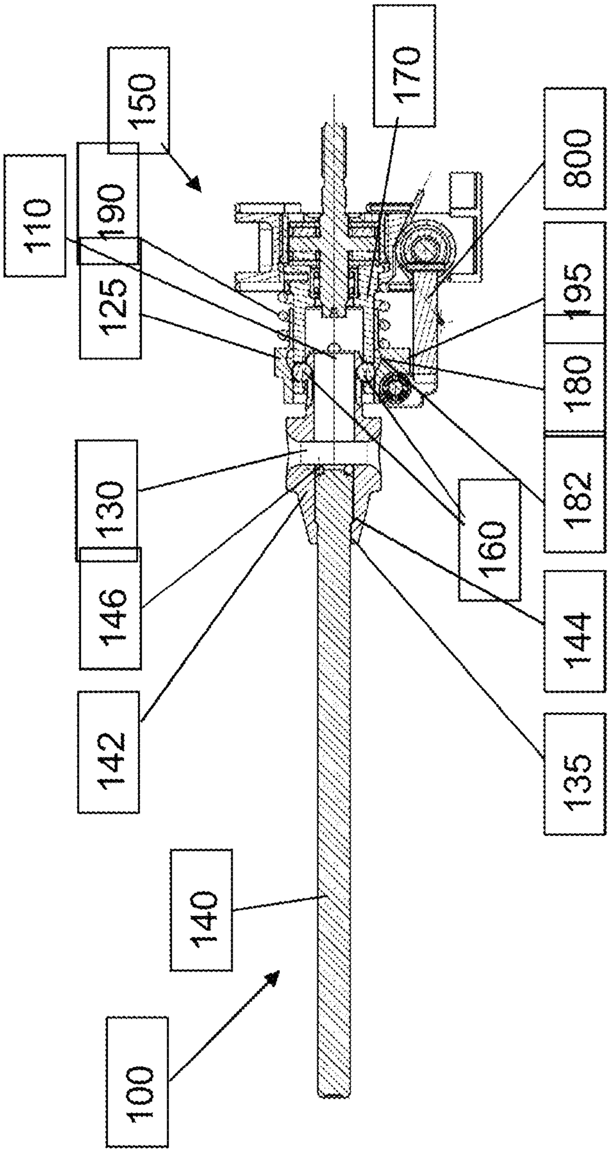
FIG. 6 shows a longitudinal section of a clutch device with an engaged piston.

FIG. 6 shows a longitudinal section of the clutch device 150 with the engaged piston 100. The piston 100 has for this purpose a coupling plug-in part 110 with coupling recesses, in which a number of locking elements 160 of the clutch device 150 can engage. Furthermore, the piston 100 has an actuating element, formed as a shoulder 125, and also a band lead-through 130 and a convexly conical portion 135. The locking elements, formed in particular as balls 160, and/or the inner sleeve 170 consist of preferably hardened steel. Preferably, the parts of the clutch device that are moved with respect to one another, in particular the locking elements and/or the inner sleeve, are provided with a sliding agent or lubricant. In the case of exemplary embodiments that are not shown, the locking elements and/or the inner sleeve consist of ceramic.

The piston 100 comprises a shaft 140 and a head 142, the shaft 140 and the head 142 preferably being soldered to one another. A form fit in the form of a shoulder 144 prevents the shaft 140 from slipping out of the head 142 in the event of a soldered connection 146 failing. In the case of an exemplary embodiment that is not shown, the piston is formed in one piece.

An engagement of the piston 100 in the clutch device 150 begins in an unlocked state of the clutch device 150, in which the outer sleeve 180 acted upon by the return spring 190 allows the balls 160 to be received in the recesses 182. The piston 100 can therefore displace the balls 160 to the outside during insertion of the piston 100 into the inner sleeve 170. With the aid of the shoulder 125, the piston 100 then moves the outer sleeve 180 against the force of the return spring 190 and closes the clutch device 150. As soon as the pawl 800 is in engagement with the coupling pin 195, the clutch device 150 is held in the locked state. In the case of an exemplary embodiment that is not shown, one or more driving elements of an energy transmission device each have an actuating element which displaces the outer sleeve when the piston is retracted into the clutch device. The driving elements serve in this case for moving the piston to the clutch device, so that the driving elements are moved along with the piston.

As described above, the piston is engaged in the clutch device by the spindle nut 320 with the aid of the return rods 199. How far the piston 100 is retracted into the clutch device 150 depends here on a stopping position of the spindle nut 320. Since the stopping position of the spindle nut 320 may shift over time, for example due to temperature fluctuations and/or wear, there is the risk that the piston 100 is not always securely engaged in the clutch device 150. To counteract this risk, the piston 100 is retracted so far into the clutch device that it covers an additional distance after engagement. Sufficient space must be provided within the clutch device 150 for this additional distance. In order to be able to choose said additional distance covered by the piston 100 to be as small as possible, the recurring return operation is controlled by a method described below.

The control device 500 controls the stopping of the spindle nut 320 forming a control element in the stopping position shown in FIG. 4 by means of a control parameter, for example an electrical voltage, a current intensity, a rotational speed and/or a switching-off time of the motor or the number of revolutions or commutations of the motor to a switching off of the motor which drives the spindle 310. In order to detect an actual stopping position of the spindle nut 320 at the time of its stopping, the driving apparatus has a coupling sensor 198, which transmits a signal to the control device 500 as soon as the piston 100 is engaged in the clutch device 150 and/or the clutch device 150 is closed. The control device 500 then forms a difference between the actual stopping position and a desired stopping position of the spindle nut 320, for example by counting revolutions/commutations of the motor after reception of the signal transmitted by the clutch sensor 198 and stopping of the motor or the spindle nut 320. If the difference formed exceeds a predetermined desired value, the control device 500 adjusts the control parameter for a subsequent return operation. This makes it possible to use a small clutch device 150.

The invention has been explained using the example of a driving apparatus for fastening elements. It is pointed out, however, that the apparatus according to the invention and the method according to the invention are also suitable for other applications.

The invention claimed is:

1. A driving device for driving a fastening element into a base material, the driving device comprising a power unit; a driving element, which is driven by the power unit from a starting position into a setting position, in order to drive a fastening element into the base material; a clutch device configured to hold the driving element in the starting position when the driving element is engaged in the clutch device; a control element that returns the driving element from the setting position into the starting position and that stops in a stopping position during a recurring sequence of movements; a motor that drives the control element a control device configured to control stopping the control element in the stopping position by at least one control parameter; and a coupling sensor that transmits a signal to the control device upon at least one of the driving element's engaging in the clutch device and closing the clutch device; wherein the control device is configured to count revolutions or commutations of the motor after receipt of the signal transmitted by the coupling sensor and before stopping the motor, to form a difference between an actual stopping position and a desired stopping position of the control element and to adapt the at least one control parameter for a subsequent sequence of movements of the control element if the difference exceeds a predetermined desired value.

2. The apparatus as claimed in claim 1, wherein the control element reverses direction of movement of the control element during the recurring sequence of movements in the stopping position.

3. The driving device as claimed in claim 1, the power unit comprising a potential energy store, for storing potential energy by which the driving element is driven, and an energy transmission device for transmitting energy from an energy source to the potential energy store.

4. The driving device as claimed in claim 3, the energy transmission device comprising the control element, and the control element being moved into the stopping position in order to store potential energy in the potential energy store.

5. The driving device as claimed in claim 3, the energy transmission device comprising a spindle drive, which has a threaded spindle and a spindle nut, the control element comprising the threaded spindle or the spindle nut.

6. The driving device of claim 3, wherein the energy store comprises a spring.

7. The driving device as claimed in claim 1, the at least one control parameter comprising an electrical voltage, a current intensity, a rotational speed and/or a switching-off time of the motor during the recurring sequence of movements.

8. The driving device of claim 1, wherein the driving element comprises a piston.

9. A method for controlling a setting device for driving a fastening element into a base material, the setting device comprising a driving element, a clutch device, a control element, and a motor, the method comprising driving the driving element from a starting position into a setting position, in order to drive a fastening element into the base material; holding the driving element in the starting position when the driving element is engaged in the clutch device; returning the driving element from the setting position into the starting position in a recurring sequence of movements of the control element controlling stopping of the control element in a stopping position by at least one control parameter; transmitting a signal to the control device upon at least one of the driving element's engaging in the clutch device and closing the clutch device; counting revolutions or commutations of the motor after receipt of the signal and before stopping the motor; forming a difference between an actual stopping position and a desired stopping position of the control element and adapting the at least one control parameter for a subsequent sequence of movements of the control element if the difference exceeds a predetermined desired value.

10. The method as claimed in claim 9, including reversing a direction of movement of the control element during the recurring sequence of movements in the stopping position.

11. The method as claimed in claim 9, the setting device comprising a potential energy store, for storing potential energy by which the driving element is driven, and an energy transmission device for transmitting energy from an energy source to the potential energy store.

12. The method as claimed in claim 11, the energy transmission device comprising the control element, and the control element being moved into the stopping position in order to store potential energy in the potential energy store.

13. The method as claimed in claim 9, the at least one control parameter comprising an electrical voltage, a current intensity, a rotational speed and/or a switching-off time of the motor during the recurring sequence of movements.

* * * * *